United States Patent

Haugs

[11] Patent Number: 5,833,291
[45] Date of Patent: Nov. 10, 1998

[54] INFLATABLE GRIPPING OR SUPPORT DEVICE

[76] Inventor: Audun Haugs, Nattlandsfjellet 56, N-5030 Landås, Norway

[21] Appl. No.: 632,405
[22] PCT Filed: Oct. 22, 1993
[86] PCT No.: PCT/NO93/00157
  § 371 Date: Jul. 19, 1996
  § 102(e) Date: Jul. 19, 1996
[87] PCT Pub. No.: WO95/10997
  PCT Pub. Date: Apr. 27, 1995
[51] Int. Cl.⁶ .............................. B25J 15/00; A61G 7/00
[52] U.S. Cl. ............................ 294/119.3; 5/615; 5/715
[58] Field of Search ................. 294/98.1, 99.1, 294/119.3; 5/607, 612, 615, 710, 711, 713, 715, 706; 441/40, 129, 133; 901/22, 36, 37, 39

[56] References Cited

U.S. PATENT DOCUMENTS

| | | | |
|---|---|---|---|
| 2,691,179 | 10/1954 | Kann | 5/710 |
| 3,667,073 | 6/1972 | Renfroe | 5/715 X |
| 4,389,961 | 6/1983 | Parish | 5/710 X |
| 4,815,782 | 3/1989 | Craig et al. | 294/119.3 |
| 5,060,324 | 10/1991 | Marinberg et al. | 5/715 X |
| 5,067,189 | 11/1991 | Weedling et al. | 5/715 X |
| 5,375,273 | 12/1994 | Bodine et al. | 5/715 X |

FOREIGN PATENT DOCUMENTS

| | | | |
|---|---|---|---|
| 2816642 | 10/1978 | Germany | 5/615 |
| 4111792 | 4/1992 | Japan | 294/119.3 |
| 737206 | 5/1980 | U.S.S.R. | 294/119.3 |
| 903336 | 8/1962 | United Kingdom | 5/615 |

*Primary Examiner*—Johnny D. Cherry
*Attorney, Agent, or Firm*—McAulay Nissen Goldberg Kiel & Hand, LLP

[57] ABSTRACT

In one embodiment, a tool is provided for gripping an object while in another embodiment, the tool is provided for supporting or tuning a person or object resting on a bed or other support. The tool is comprised of a hollow body which can be deformed under a pressure-loaded condition into a concavely curved main surface with an opposite convexly curved back surface. The hollow body has a plurality of parallel chambers on opposite sides of a housing which is transversed to the chambers so as to receive a pressurized medium via the housing. When pressure medium is applied to the chamber, the chamber deforms from a rectilinear condition into a curved condition.

26 Claims, 4 Drawing Sheets

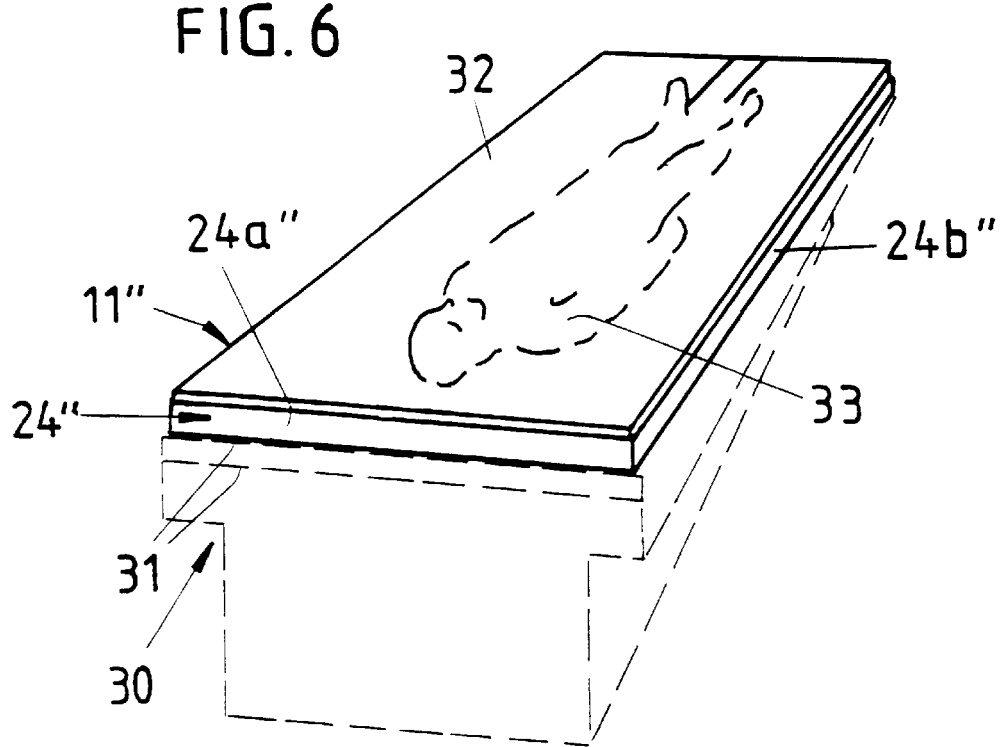
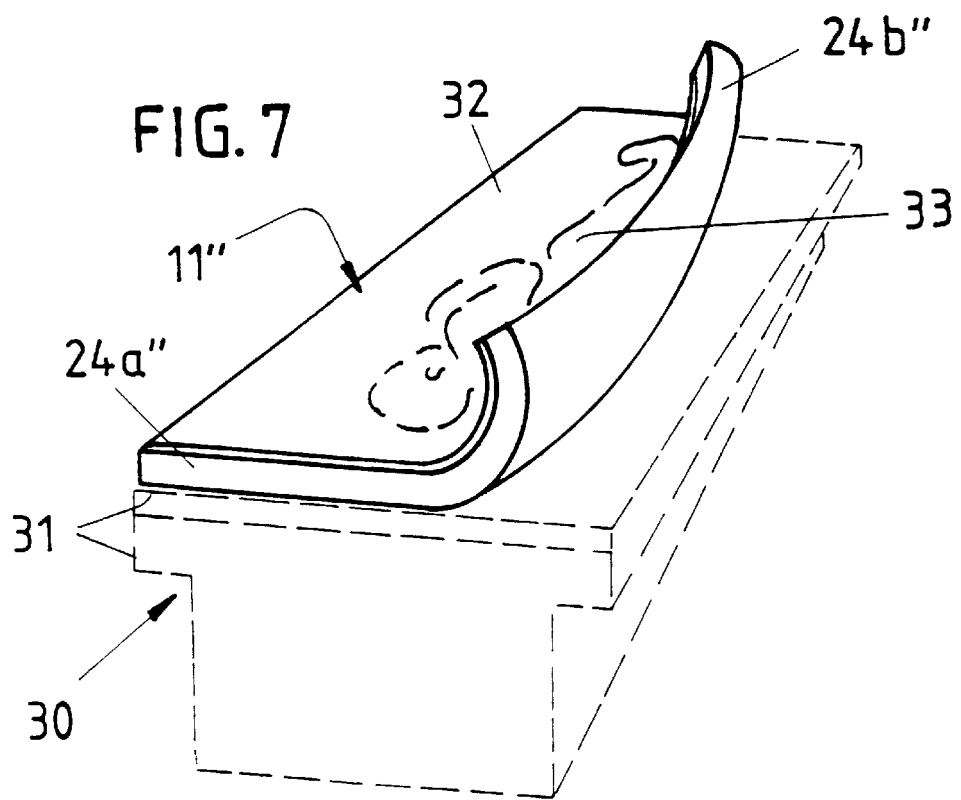

INFLATABLE GRIPPING OR SUPPORT DEVICE

The present invention relates to a tool, driven by pneumatic or hydraulic pressure medium and made of soft, non-elastic, flexible composite material, for example reinforced plastic or reinforced rubber, for gripping, holding, clamping, turning or similar actuation of a person or object, comprising a hollow body which in a pneumatically or hydraulically loaded condition is adapted to form a concavely curved main surface and an opposite convexly curved back surface.

With the present invention the particular aim is to handle elongate, sensitive objects, such as offshore pipe sections made of composite materials, that is to say pipe conduits or pipe sections which are coated with an externally protective coating. However, application of the solution can also be considered for other types of arbitrary objects, but preferably for elongate objects.

The tool of the invention will also be able to be applied with advantage within the technology of space travel, where the objects are to be moved in a more or less weightless condition. For example the tool may be used for the launching or fetching in of satellites from or into space ships.

Furthermore, an aim is to apply the solution in connection with the handling of more or less inactive persons and especially persons with handicaps and generally patients during hospital treatment and other forms of care, where it is appropriate to lift, turn or handle the person in another way in an especially gentle manner.

From NO patent 166 023 corresponding to European Patent 0479778 and, in part, to U.S. Pat. No. 5,568,957 a gripping or holding means is known, which is for example in the form of a so-called "robot hand" with two or more "robot fingers". This gripping means has a cover for each gripping or holding part being made with a shape having a bent or curved gripping position, so that in a starting position, the gripping or holding part is adapted to assume such a bent or curved gripping position. The force from a pressure medium can then be mainly used for the clamping function itself. In the known construction, the cover is longitudinally divided into a first cover chamber on the back side of the cover and a second cover chamber on the engagement side of the cover. By alternately placing the first and the second cover chamber in connection with the source of pressure medium, and the source of pressure relief respectively, the cover can be pressure activated in an active bent or curved starting position and pressure activated in the opposite direction to an inactive, non-bent or non-curved position. In other words in a starting position, with a naturally bent or curved cover, the pressure force of the pressure medium can be mainly utilised in the first cover chamber to exert a clamping force in the clamping engagement position, while correspondingly by pressure loading of the second cover chamber and simultaneously pressure relieving the first cover chamber, the cover can be forcibly adjusted into a positive open position. A corresponding effect can if desired be employed in the present invention, without being based on such a mode of operation.

Further a similar solution is known from NO 163 518, where a pressure medium-operated means is readjustable from an outstretched to a compressed condition on actuation of a local region of the means. This is achieved in that a first region is provided with locally defined, internal pocket formations connected to an associated pressure medium conduit and a second region without such pocket formations. On inflating the region with pocket formations, a breadthways and/or lengthwise compression of the means or an equivalent linear force in the means can be achieved. In practice, several such mutually cooperating pocket formations in a row can be utilised. An effect as the means of NO 163 518 achieves can be utilised in connection with the present invention, without being based on such a solution and such an effect.

An additional effect, which is achieved according to the two known constructions and which can be utilised according to the invention, is that a directionally determined bending or curving of the means can be ensured, based on the established design of the means which is determined by the shape of the means in the bent or curved position. According to the present invention, the aim is a particular effect by allowing individual chambers of the cover to support each other sideways in a clamping engagement position, in order to form thereby a more or less continuous, relatively large back surface in the cover and an equivalent, relatively large main surface or engagement surface in the cover. With this the aim particularly is to be able to exert clamping forces, for example relatively large clamping forces, in a uniformly distributed manner over relatively large surface areas with local adjustment according to local irregularities in the object which is to be handled, in order thereby to be able to handle relatively large objects in a gentle, but at the same time controlled and reliable manner. Simultaneously with this, one can ensure by simple means that the cover automatically assumes a bent or curved condition or bends or curves in the intended directionally determined manner. In other words, the aim is that individual chambers mutually support each other so that these collectively bend or curve in the intended directionally determined manner.

Generally, the aim is a novel solution for many different fields of use in connection with the handling of objects or persons relative to a base. When there is a discussion about objects in the present instance, the specific (but not exclusive) discussion is about sensitive objects, which ought to be treated with caution in order to prevent the occurrence of damage to the object. When there is discussion about persons in the present instance, it is first and foremost discussion about patients, who must be treated with corresponding caution. The solution according to the invention can be used for example in connection with various lifting operations, such as on moving objects or persons from position to position, including gripping, clamping and holding in a first position, lifting or another movement to a new position and subsequent releasing in the new position. The solution can also be used for less extensive movements, for example for turning of a bed-ridden patient on an associated couch, such as turning of patients in order to prevent bed sores. In such a case, it can be appropriate to activate only portions of the tool, for example in order to turn a person in a direction towards the left, and later to activate other portions of the tool in order to turn the person to the right back to the starting position, or in order to turn the person further towards the right away from the starting position.

The tool of the invention is generally designed for use in connection with gripping, clamping and holding operations plus lifting operations as robot tools, for handling of relatively light and small objects, but especially for objects having relatively large dimensions and relatively large weight.

With the present invention, the aim is first and foremost a tool which can handle certain types of sensitive objects, such as pipe sections, which are coated with externally protective coatings, satellites or other objects, which are handled in space, or persons, which must be treated in an especially gentle manner, such as nursing patients who are to be turned on a bed base.

The present invention is published on Mar. 3, 1994 in NO-B-175 808 which was filed on Jul. 12, 1992.

Briefly, the invention provides a tool which is characterized in having a hollow body which consists of at least four and preferably a series of individual chambers mutually connected sideways, which are connected to each other in pairs via an intermediate, chamber-defining partition, the one surface of the individual chambers in common constituting the main surface of the hollow body, while the opposite other surface of the individual chambers constitutes the back surface of the hollow body.

By the solution according to the invention a clamping and holding can be achieved, for example by simultaneously bending or curving the hollow body in a controlled manner by way of simple means, the individual chambers mutually and in cooperation with the back surface of the hollow body, being able to ensure an equivalent curvature of the individual chambers, with simultaneous mutual support between individual chambers. More specifically by hollow bodies, which are elongated in a direction across the plane of curvature of the hollow body, a hollow body can be obtained which according to the conditions is relatively elastically yielding and softly gripping, but at the same time effectively clamping with sufficient force. This involves the hollow body being able to be adapted locally with a somewhat different degree of curvature relative to the different adjacent regions of the object which is to be handled, reckoned in a direction across the plane of curvature of the hollow body. The effect obtained can be utilised for a number of different purposes, which the tool according to the invention finds application for, such as will be described in more detail in the following description.

In a first aspect of the present invention this is characterised in that individual chambers of the hollow body extend longitudinally reckoned in the plane of curvature of the hollow body, that the back surface reckoned in the plane of curvature of the hollow body has a larger longitudinal dimension than the main surface, and that individual chambers of the hollow body are mutually separated in pairs via the intermediate partition in the form of a partition wall which is arranged in the plane of curvature of the hollow body. A cover is hereby obtained with an especially simple form, which is easy to handle in practical use, for the handling of sensitive objects as well as for the handling of sensitive persons.

It is preferred that the hollow body is provided with a centrally arranged fastening portion or suspension portion, said portion being combined with a pressure medium intake to and outlet from the hollow body, to form two opposite hollow body portions curvable towards each other. This solution can be employed with advantage both in the lifting and turning of an object or a person. In connection with lifting operations, the tool is characterised in that the suspension portion is in the form of a rigid, hollow housing member, to which there is fastened, support chain or similar support means for lifting and lowering of the tool and hose connections for the supply of pressure medium to and for the return of pressure medium or return medium from the housing member and internal duct connections to the respective hollow body portions, one of the hollow body portions being respectively fastened to the housing member on mutually opposite sides of same.

It is preferred that the tool is equipped with a prestressing arrangement in the form of a spring arrangement, which from active to inactive position, that is to say on pressure relief of the tool, readjusts the tool from a compressed gripping position to an opened more or less spread position. For example, one can consider lengths of spring steel which are inserted between two layers of reinforced cloth material in the main surface (gripping surface) of the individual chambers. In practice, the spring can be designed so that it only exerts sufficient force to open the tool, so that in a more or less pressure-relieved condition, the tool can be guided outwardly from engagement with or inwardly into engagement with the object which is to be handled by the tool. In another aspect of the invention for use for example in the handling of persons on a bed rest, the tool is characterised in that the fastening portion is in the form of two mutually parallel, hollow housing members each with a hose connection for the separate supply of pressure medium to and for the separate return of pressure medium or return medium from the housing member and each with its or with their internal duct connections to an associated hollow body portion, one of the hollow body portions being respectively fastened to its housing member on respective opposite sides of the same.

By means of the two hollow body portions, there is hereby the possibility to effect one after the other mutually different movements or equivalent movements at different moments.

In connection with the handling of a person on a base, such as a bed rest, the tool is characterised in that the hollow body is supported on its under side, via rigid, preferably pin-shaped support means on a carrier plate, at a level above the upper side of the carrier plate.

A controlled bending or curving of the tool can hereby obtained.

It is preferred that the hollow body is provided with a row of individual chambers, which extend across the plane of curvature of the hollow body, and that the hollow body or each hollow body portion between the individual chambers is provided with a common internal duct system running in the plane of curvature of the hollow body. The effect obtained is based on the corresponding stretching effect which is obtained according to NO patent 163 518, only with the difference that the stretching effect is tied to the associated carrier plate. Further features of the present invention will be evident from the following description having regard to the accompanying drawings, in which:

FIG. 6 shows in perspective a tool according to the invention used in connection with a bed rest, where a person is indicated in the usual back rest position and where the tool is illustrated in the inactive condition.

FIG. 7 shows the same as in FIG. 6, where the person is indicated in a side rest position and where one hollow body portion of the tool is illustrated in an inactive condition.

Figure 1:
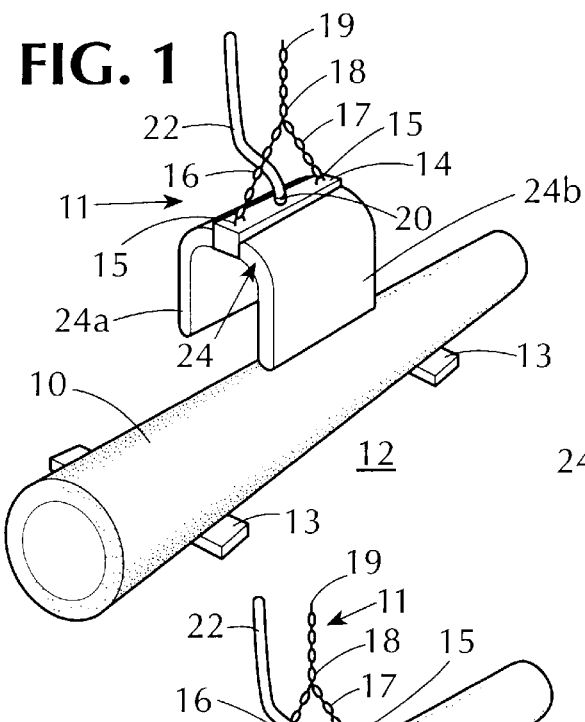
FIG. 1 shows in a perspective representation a tool according to the invention used in connection with the handling of an elongate object, which is illustrated in the form of a pipe piece which is to be lifted, and with the tool illustrated in position so as to be guided into engagement with the pipe piece.

In FIG. 1 a pipe piece 10 is shown of composite material for use in offshore activity, the pipe piece 10 being externally clad with a protective layer, which is sensitive to different types of mechanical influences and especially to locally high point loadings. Further, there is shown a tool 11 according to the invention in an inactive position, ready for engagement with the pipe piece 10, which rests on a base 12 via support blocks 13.

Figure 2:
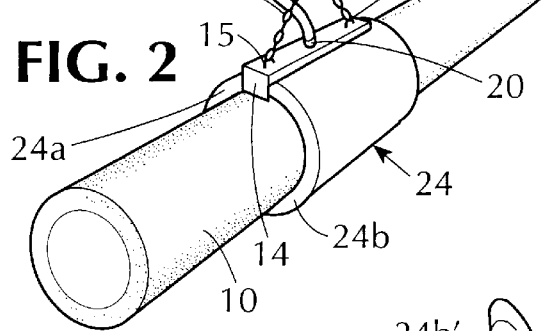
FIG. 2 shows the tool in a representation corresponding to FIG. 1 guided into place in clamping engagement with the pipe piece which is to be lifted.
Figure 3:
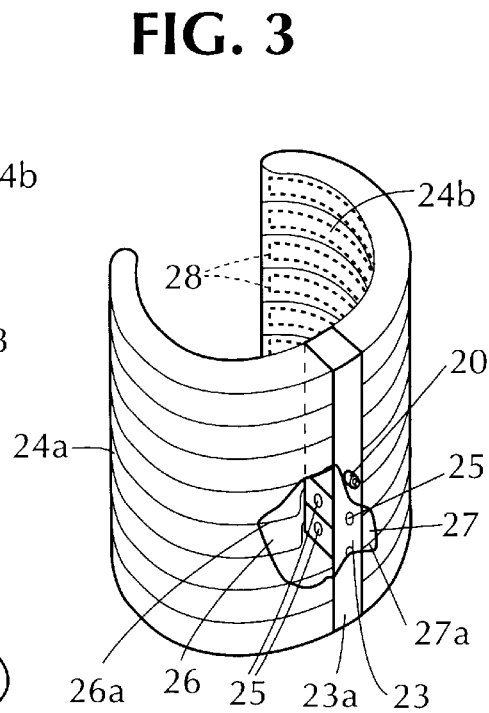
FIG. 3 shows in a perspective representation a section of the tool as illustrated in FIGS. 1 and 2, with certain portions broken away for the sake of simplicity.
Figure 4:
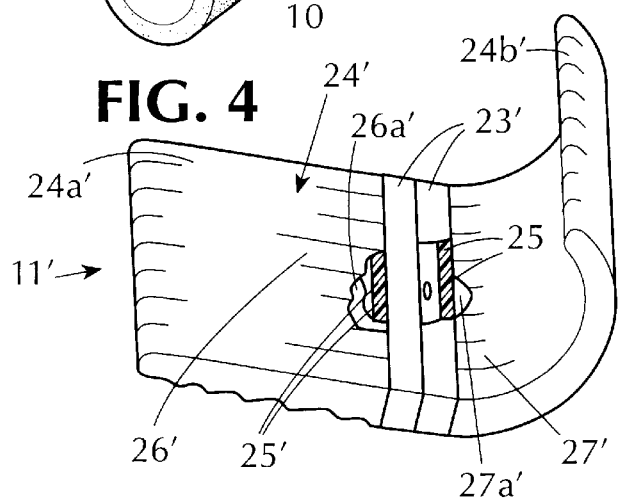
FIG. 4 illustrates a perspective view of a tool having one hollow body portion in a bent active position in accordance with the invention.
Figure 5:
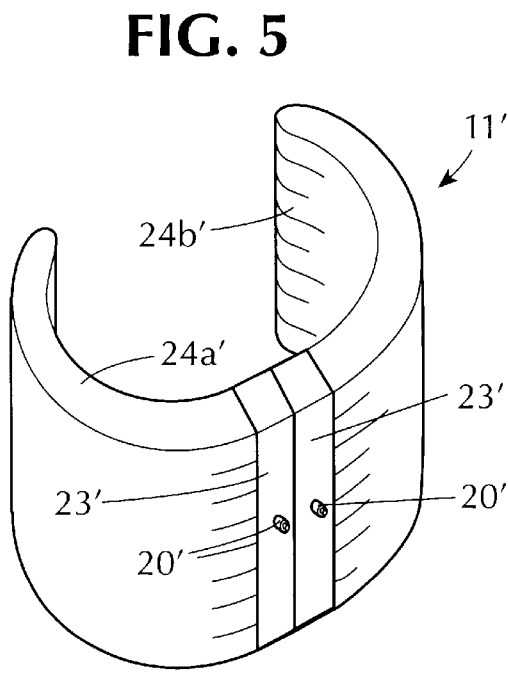
FIG. 5 illustrates a perspective view of the tool of FIG. 4 with two hollow body portions in bent active positions.

The tool 11, which is used in the embodiment of FIGS. 1–3, and a tool 11', which is used in the embodiment of FIGS. 4–5, are based on the tool being designed at the starting point with a hooked, unbraced or slightly braced shape and on use is placed under pressure, so that a movement occurs which stretches the tool to a braced, hooked position. Said movement can be achieved in a corresponding manner as indicated in NO patent 166 023.

The tool 11 is provided with a rigid, central carrier yoke 14, to which are fastened support rings 15 with associated support straps 16,17. The support straps are connected via a common fastening ring 18 to a hoisting line 19. In the construction illustrated, the support straps 16,17 and the hoisting line 19 are made of chain, but alternatively can be made of wire or another suitable strap material. In addition the carrier yoke 14 is provided with a fastening nipple 20 for rapid coupling of a hose 22 for the supply of pressure fluid or compressed air to an internal distribution chamber 23 (see FIG. 3), or for removing return fluid or return air from the distribution chamber 23.

The carrier yoke 14 forms part of a permanent connection to a hollow body 24, which with hollow body portions 24a and 24b projects laterally outwards from the carrier yoke 14 in mutually opposite directions from the centrally arranged carrier yoke 14 on its two mutually opposite long side surfaces. In the illustrated embodiment, the hollow body 24 is made of soft, non-elastic, but flexible composite material, such as reinforced plastic or reinforced rubber.

More specifically, the hollow body 24 comprises, as is shown in FIG. 3, a centrally arranged housing member 23a which defines the distribution chamber 23. This housing member 23a can be made of the same material as the remainder of the hollow body, but alternatively can be made of an arbitrary rigid material. As shown in FIGS. 1 and 2 the housing member 23a also forms part of the carrier yoke 14, since it is directly fastened to the carrier yoke 14, which in a practical construction can also form the weight-forming portion of the tool, independently of the weight of the hollow body. In practice, the carrier yoke 14 can totally or partially surround the hollow body 24 in the vicinity of its housing member 23a. As is shown in part in FIG. 3, the housing member 23 is provided with a series of port openings 25 in the longitudinal direction of the housing member 23a, that is to say with a port opening for each individual chamber or part chamber as illustrated at 26 in the hollow body portion 24a and at 27 in the hollow body portion 24b. At 26a and 27a there is shown a partition wall between a pair of individual chambers 26 and 27. By means of a common source of pressure medium, individual chambers 26 and individual chambers 27 can be pressure loaded via the common distribution chamber 23 in the housing member 23a with a common medium pressure and an equivalent uniformly distributed surface pressure ensured against the object (or the person) to be handled.

The individual chambers 26, 27 are, as shown, in parallel on each side of the housing member 23.

As illustrated in FIG. 1, the hollow body 24 is in an inactive pressure-relieved position with the body portions 24a, 24b disposed in a downwardly directed and suspended manner so as to be free to move in directions towards and away from each other.

Referring to FIG. 2, the hollow body 24 is illustrated in a pressure-activated gripping and holding position. In this position, the depending hollow body portions 24a, 24b are bent by means of a pressure medium to clamp onto a pipe piece 10. In this way, the pipe piece 10 is held in a firm pressurized grip between the bent body portions 24a, 24b.

In the illustrated embodiment of FIG. 3, rib-shaped prestressing means 28 are shown which are arranged in the gripping surface of the hollow body 24. More specifically, steel leaf springs 28 are employed which are inserted between two layers of cloth in the gripping surface of the hollow body.

By means of the leaf springs 28, the hollow body can be opened from the hooked condition illustrated in the FIG. 3 to a more spread planar condition upon the release of pressure.

As illustrated in FIG. 3, both the left hand side hollow body portion 24a and the right hand side hollow body portion 24b are bent in relation to an intermediate common carrier yoke 14 by the pressure of the pressure medium in the body portions 24a, 24b against the bias of the leaf springs 28 located near the upper surface in the hollow body portions 24a, 24b.

Each leaf spring 28 is initially shaped to a flatted shape to accommodate the starting point of the tool 11 as illustrated in FIG. 1 and is moved towards a curved shape upon the introduction of pressurized medium into the chambers 26, 27. Upon release of the pressure from the pressure medium, each spring 28 biases the respective chamber 26, 27 back to the flattened shape.

In FIG. 2 a tool is shown according to the invention in the pressure-loaded condition, after the hollow body 24 is lowered in place around the pipe piece, whereby the tool is made to surround and firmly clamp the pipe piece between the hollow body parts 24a and 24b in their finally inflated (dilated) condition.

A tool 11', as illustrated in FIGS. 4 and 5, has a hollow body 24' which is constructed to substantially correspond to the hollow body of FIG. 3, with the only difference that instead of one distribution chamber 23 between the hollow body portions 24a and 24b, two separate distribution chambers 23' are employed. More specifically, a distribution chamber is employed for each hollow body portion 24a', 24b'. The distribution chambers 23' are provided with their respective nipple 20' for the coupling of pressure medium hoses (not shown further). The two distribution chambers 23' (see FIG. 4) are further provided with their respective sets of port openings 25' for each of their individual chambers 26' and 27'. The hollow body portions 24a' and 24b' can hereby be operated separately or jointly as required.

In FIGS. 6 and 7 the tool is used in a bed rest 30, where the bed itself with associated bed base is indicated in broken lines 31 and where the tool 11" is illustrated in full lines. The tool 11" in this case comprises an under mattress in the form of a hollow body 24" together with an easily exchangeable upper mattress 32 of foam material or another suitable material. In the illustrated embodiment, the upper mattress 32 is fastened for easy release to the hollow body 24", but can if necessary be arranged on the under mattress without special fastening means. In practical use, the under mattress and the upper mattress can separately constitute an integral part of the tool 11", but in certain instances the upper mattress can be omitted in the tool and only the under mattress (the hollow body 24") used. Generally and for practical reasons, it is an advantage on the other hand that the under mattress is secured to the base, so that the former can be moved in a controlled and reliable manner relative to the base. For example, in a longitudinal middle region the under mattress can be intermittently secured to the base in a manner not shown further, for example directly to the bed bottom, by means of fastening straps or similar fastening means. In FIG. 6 a person is shown in broken lines 33 in the usual back rest position and arranged substantially in the middle of the bed rest 30. In this position, the hollow body 24" can be filled with pressure medium, for example fluid, without excess pressure, so that the person 33 is supported by a fluid-filled under mattress or hollow body 24". In this condition, the hollow body 24" together with the upper mattress 32 can extend level or substantially level on the base.

In FIG. 7 the tool 11" is shown, comprising the hollow body 24", which forms the upper mattress, in an activated condition, that is to say with a special pressure medium loading of the one (right) hollow body portion 24b" illustrated, while the other (left) hollow body portion 24a" retains the inactive, planar extending position. There is hereby the possibility to effect a turning of the person 33 from a back rest position, as shown in FIG. 6, to a side rest position as shown in FIG. 7. In FIG. 7, the hollow body portion 24b", and thereby also the associated portion of the upper mattress, is shown bent or curved to a different degree reckoned in the longitudinal direction of the bed rest. This is ensured in that by means of a common pressure medium, different individual chambers in the hollow body portion 24b" can be curved in relation to the dimensions and weight of the person who is to be turned. There is hereby the possibility to be able to effect the turning with an equivalent uniformly distributed pressure over the whole longitudinal dimension of the person and thereby with a gentle load of the person on the various body parts of the latter, at the same time as the hollow body part 24b" is moved as a coherent unit.

In an equivalent manner the person 33 can be turned back from the position illustrated in FIG. 7 to that illustrated in FIG. 6 by relieving the excess pressure in the illustrated right hollow body portion 24b" of the hollow body 24". Further by activating the illustrated left hollow body portion, the person can be turned in an additional direction towards the right to an opposite side rest to that which is illustrated in FIG. 7.

In certain cases, both of the hollow body portions can be pressure loaded and pressure relieved in a continuous, simultaneous operation, by only pressure relieving the one hollow body part, while at the same time increasing the pressure load in the other hollow body portion, thereby having the possibility of being able to hold the person 33 in a controlled grip with both hollow body portions during the whole turning operation.

It will also be possible to control the turning operation manually by corresponding manual control of the supply of pressure medium and manual control of the return flow of the pressure medium respectively. However, by way of for example time-controlled or with available automatic means, it will also be possible to effect turning of the person for set times or with set time intervals without equipment for this purpose being illustrated herein.

In FIGS. 8–11 there is shown an alternative construction of the tool 11" which is employed in the embodiment as illustrated in FIGS. 6 and 7. Individual chambers 26" and 27" are shown which extend parallel to the longitudinal direction of the bed rest. This solution is based on principles corresponding to those shown in NO patent 163 518, where a linear contraction can be translated into a curving or pivot joint-movement. In this embodiment, the hollow body 24" is made up of layers of cloth which are welded together with strip-formed portions, which form an annular peripheral edge 35 and a series of relatively narrow rib-formed partition walls 36 and a middle relatively broad partition wall 37. By means of the peripheral edge 35 and the partition walls 36,37 a series of individual chambers 26" and 27" is defined in a common hollow body portion 24a" and 24b", the hollow body 24" being divided by way of the central partition wall 37 into the two hollow body portions 24a" and 24b". A first hollow body portion 24a" with associated individual chambers 26" is supplied with pressure medium via a first conduit 38 (or pressure medium is removed via the conduit 38), while a second hollow body portion 24b" with associated individual chambers 27" is supplied with pressure medium via a second conduit 39 (or pressure medium is removed via the conduit 39), controlled by a remotely controlled control valve not shown further from a suitable pressure medium reservoir (not shown). At 38a and 39a there are shown transverse passages between the individual chambers 26" and between the individual chambers 27" respectively.

The tool 11" is provided lowermost with a flexible plate 40. There are shown rows of vertical support pins 41 which are rigidly connected to the plate 40 and which are rigidly connected to the hollow body 24" at the top in the illustrated strip-formed portions 35, 36, 37. In practice the hollow body 24" is mounted on top of the support pins 41 in freely suspended manner at a fixed distance above the top surface of the plate 40. Alternatively instead of the pins, a series of rib-formed support means (not shown) can be used, which extend parallel to the hollow spaces 26" and the hollow spaces 27" and more specifically can have a dimension corresponding to the rib-formed partitions 36. If desired, the rib-formed support means can extend continuously over the whole length direction of the hollow body, a small opening being able to be made in the rib-formed support means in order to ensure a place for the transverse passages in each hollow body portion.

In addition, as is shown herein, the hollow body 24" can rest against the top of a mattress 42 of foam material which is inserted between the plate 40 and the hollow body 24". By means of the support pins 41, the members 24", 40 and 42 can be effectively connected to each other into a coherent unit. By using rib-formed support means instead of the illustrated support pins, equivalent strips of such a mattress can be used in the respective intermediate spaces between each pair of support ribs instead of the coherent foam material mattress 42 illustrated. On top of this unit of the members 24", 40, 42, the afore-mentioned mattress can be arranged for example for easy release that is to say in an easily replaceable manner. Alternatively, instead of using an upper mattress, a sheet or another easily replaceable cover material can be used to prevent soiling of the hollow body during use.

Figure 9:
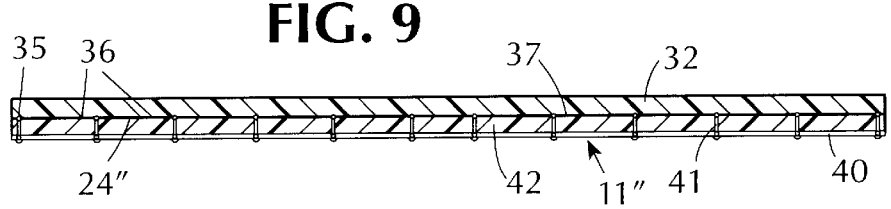
Figure 10:
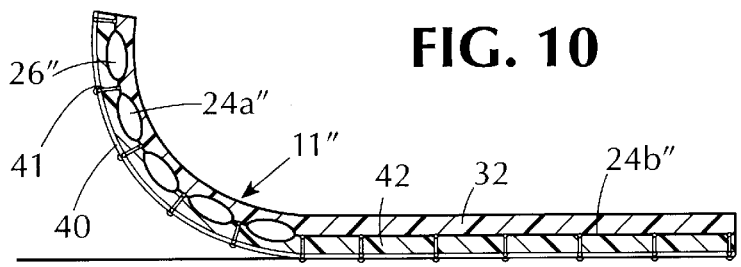
Figure 11:
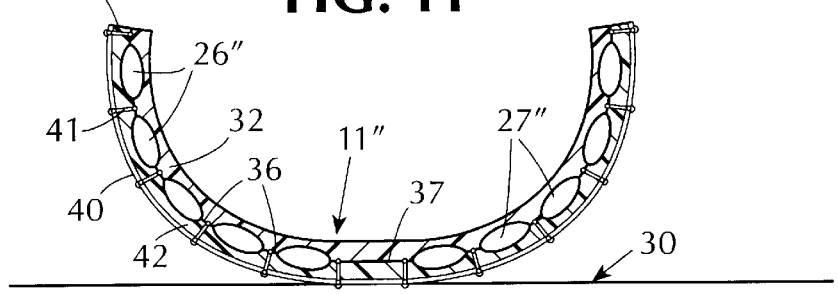

In FIG. 9 an end representation of the tool 11" is shown in a planar spread starting position. In FIG. 10 the tool 11" is shown after the left hollow body portion 24a" is activated by pressure fluid or compressed air and in FIG. 11 the tool 11" is shown after both hollow body portions 24a" and 24b" are correspondingly activated.

Figure 8:
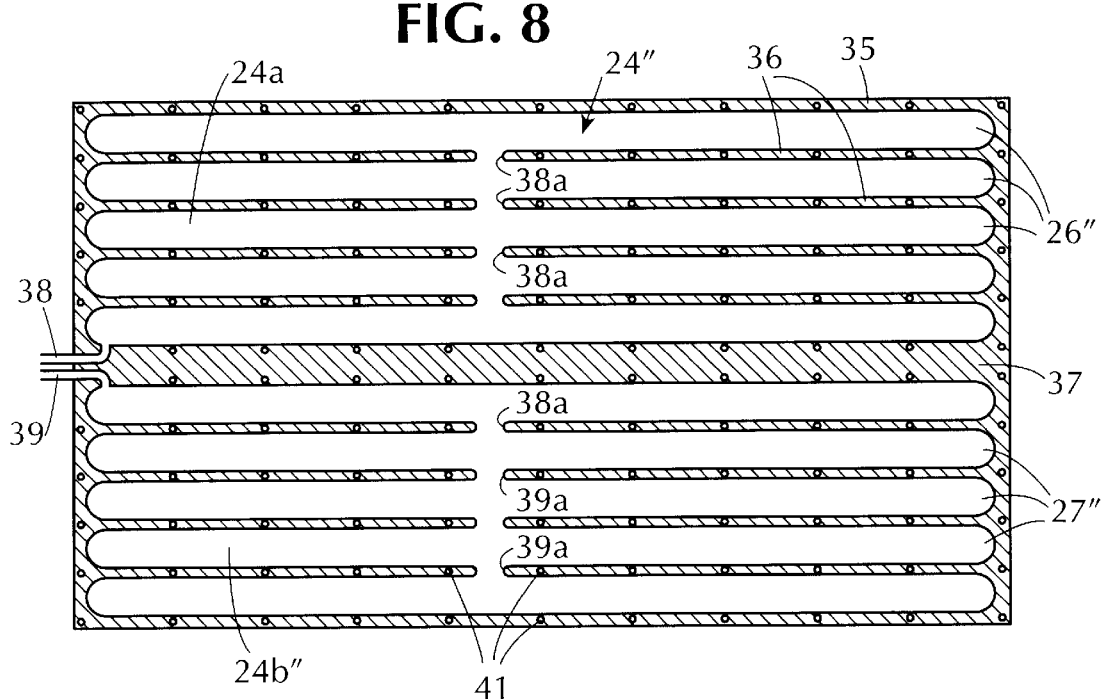
FIGS. 8–11 show in a plan representation and in an end representation respectively a third embodiment of the tool used in connection with a bed rest as illustrated in FIGS. 6 and 7.

By the tool 11" according to FIG. 8–11 an intended bending of the plate 40 can be guaranteed on equivalently compressing the hollow body 24" in a direction transversely of the longitudinal direction of the bed rest, the individual chambers of the hollow body being inflated and stretched in the height direction, that is to say in a direction at right angles to the main plane of the object as shown in FIG. 8, while being compressed at the same time in the breadth direction, that is to say in a direction transversely of the longitudinal direction of the bed rest. This involves the current hollow body portion (for example the hollow body portion 24a" in FIG. 9) being compressed together (i.e. longitudinally shrunk) sideways between the pins 41 on the plate 40 pulling the pins 41 toward each other and thereby providing for an equivalent bending or curving of the plate 40 and the associated hollow body portion 24a". Correspondingly, the plate 40 and the remaining hollow body portion 24b" can be bent to the position which is illustrated in FIG. 10.

By commencing the turning operations of the person 33 in the position of the hollow body 24" as shown in FIG. 10 (with the person 33 in a back rest position), the person can be turned in controlled fashion alternately to the left and the right on alternately relieving the pressure in the left and right hollow body portions, respectively, while the remaining hollow body portion assumes a curved condition.

Even if examples are not illustrated herein, the tool 11 or 11', which is employed in connection with the handling of an object, can with certain modifications be adapted for use in connection with a bed rest, for the handling of a person. Correspondingly the tool 11", which is employed in connection with a person, can with certain modifications be adapted for use in connection with the handling of as object (such as pipe sections or similar elongate objects) without concrete embodiments being given for this herein.

Figure 12:
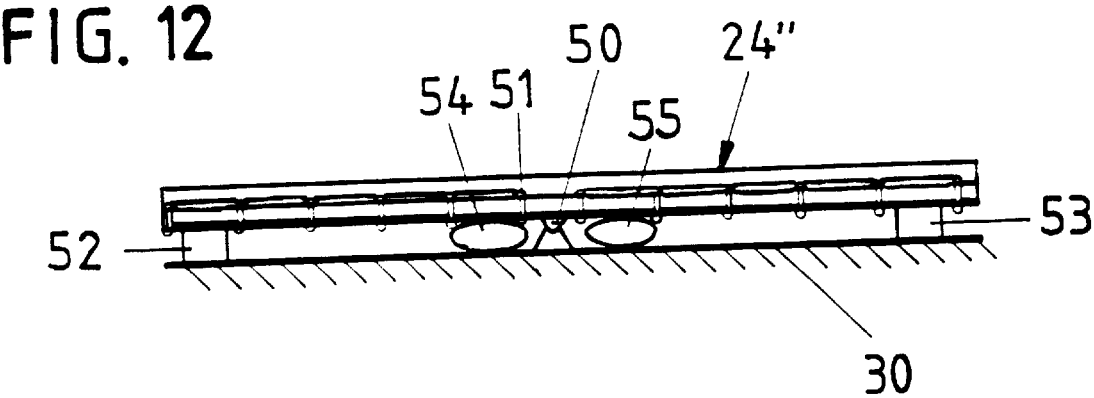
FIGS. 12–14 show a fourth embodiment of the invention in the form of a turning mattress, illustrated in cross-section and illustrated in an inactive condition in FIG. 12, in a partially activated condition in FIG. 13 and also in a fully activated condition in FIG. 14.
Figure 13:
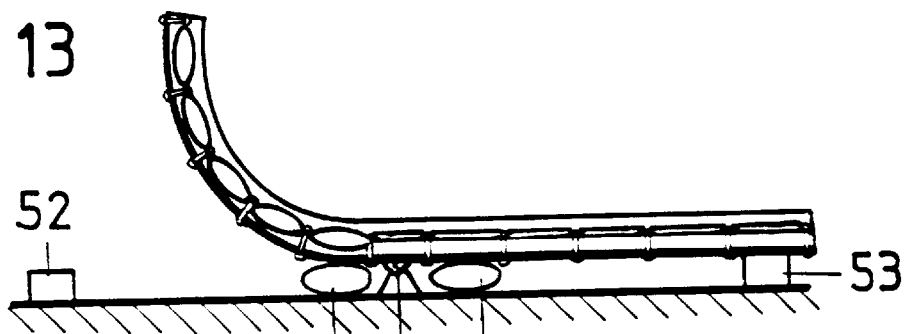
Figure 14:
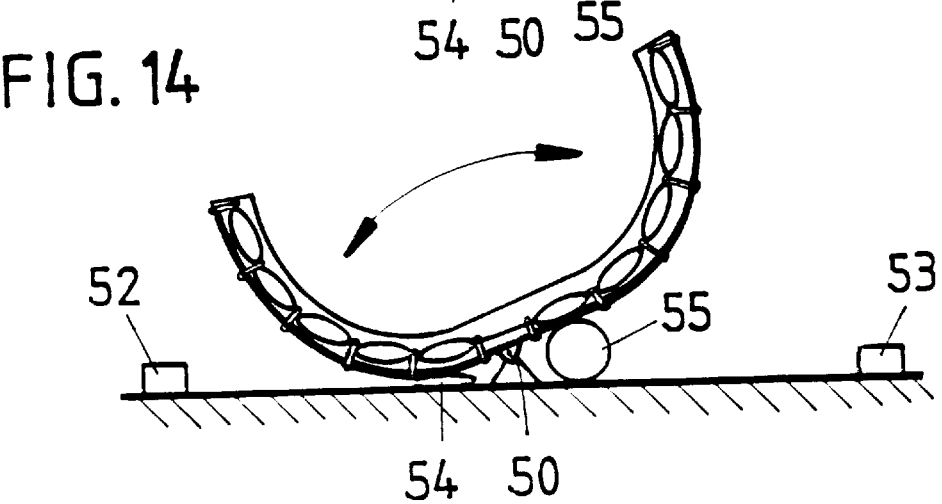

In FIGS. 12–14 a mattress 24''' is shown, correspondingly as shown in FIGS. 8–11, arranged at a level above a bed rest 30 as illustrated in FIGS. 6–7. Centrally beneath the mattress 24''' the latter is provided with a longitudinal pivot shaft 50, which is pivotally mounted in two or more mutually separated pivot bearings 51 (only one pivot bearing is shown in the drawings), which rest against the bed rest and support the mattress at a fixed level above the bed rest. At opposite side edges, the mattress is supported on the top of longitudinal support beams 52,53 which rest on the bed rest. Between the pivot shaft 50 and a respective one of the support beams 52,53, relatively tightly up to the pivot shaft, an inflatable actuating means 54 and 55, respectively, is fastened in. In the active condition of the mattress, as shown in FIG. 12, the actuating means 54,55 are illustrated in a preliminary support position, that is to say in mutually corresponding, moderately inflated condition, without exerting any lifting effect.

In FIG. 13 the mattress is shown in a condition, where only the one half of the mattress is activated and thereby lifted upwards to a level above the support beam 52 and bent over to a curved contour. However, the mattress has continued effective support in the support beam 53, in the pivot bearings 51 and in the actuating means 54,55. A person who rests on the mattress can thereby be turned to a certain degree from back rest (FIG. 12) to partial side rest (FIG. 13).

In FIG. 14 the mattress is shown in a fully activated condition, that is to say with side edge portions of the mattress itself lifted upwards and with two respective halves of the mattress bent to a curved contour. A person, who rests on the mattress in the position illustrated in FIG. 14, can thereby be secured in a controlled manner along opposite sides of the person by means of the mattress itself, with the person supported more or less in a back rest position, with effective support on the back side and along both sides of the person.

This support can be maintained while the mattress (and the person) is tilted forwards and backwards about the longitudinal axis, that is to say on swinging the mattress about the pivot shaft 50. The swinging of the mattress, in a cradle movement forwards and backwards, occurs by a controlled regulation of the pressure and by alternately pressure-relieving and pressure-loading the actuating means. In FIG. 14 the actuating means 54 is shown in a fully pressure-relieved condition and the other actuating means 55 is equivalently shown in the fully inflated condition.

Instead of the illustrated inflating means 54,55, which exert a pushing force in the one direction of movement there can be employed double-acting pushing means or a single double-acting pushing means. For example, a pushing means can be used in the form of a hydraulic or pneumatically driven pressure medium cylinder or an electrically driven pushing means.

I claim:
1. A tool comprising
  an elongated housing member defining a distribution chamber for receiving a pressure medium and having a plurality of port openings communicating with said chamber,
  a first hollow body portion of non-elastic flexible material on one side of said housing member, said hollow body portion having a plurality of parallel partition walls extending transversely of said housing member to define a plurality of parallel chambers in said hollow body portion, each said chamber in said hollow body portion being in communication with a respective port opening in said housing member to receive pressure medium therefrom;
  a second hollow body portion of non-elastic flexible material on an opposite side of said housing member relative to said first hollow body portion, said second hollow body portion having a plurality of parallel partition walls extending transversely of said housing member to define a plurality of parallel chambers in said second hollow body portion, each said chamber in said second hollow body portion being in communication with a respective port opening in said housing member to receive pressure medium therefrom;
  each said hollow body portion being responsive to an increase in pressure on a pressure medium therein to deform from an inactive condition with said body portions spread apart from each other to an active condition with said body portions bent towards each other; and a plurality of leaf springs, each leaf spring being disposed in a respective chamber of a respective hollow body portion for biasing said respective hollow body portion from said active condition towards said inactive condition in response to a decrease in pressure in said chambers of said hollow body portions.
2. A tool as set forth in claim 1 wherein said hollow body portions are disposed in parallel spaced apart relation in said inactive condition to receive an object therebetween whereby said hollow body portions grip the object therebetween in said active condition thereof.
3. A tool as set forth in claim 1 wherein said leaf springs are disposed on a side of each respective hollow body portion facing the opposite hollow body portion.

4. A tool as set forth in claim 1 which further comprises a yoke secured to said housing member and support rings secured to said yoke for lifting of said housing member and said hollow body portions.

5. A tool comprising a first elongate housing member defining a first distribution chamber for receiving a pressure medium and having a plurality of port openings communicating with said chamber;

a first hollow body portion of non-elastic flexible material on one side of said housing member, said hollow body portion having a plurality of parallel partition walls extending transversely of said housing member to define a plurality of parallel chambers in said hollow body portion, each said chamber in said hollow body portion being in communication with a respective port opening in said housing member to receive pressure medium therefrom;

a second elongated housing member adjacent and parallel to said first housing member, said second housing member defining a second distribution chamber for receiving a pressure medium and having a plurality of port openings communicating with said second chamber;

a second hollow body portion of non-elastic flexible material on one side of said second housing member, said second hollow body portion having a plurality of parallel partition walls extending transversely of said second housing member to define a plurality of parallel chambers in said second hollow body member, each said chamber in said second hollow body portion being in communication with a respective port opening in said second housing member to receive pressure medium therefrom;

each said hollow body portion being responsive to an increase in pressure on a pressure medium therein to deform from an inactive position with said body portions disposed in co-planar relation to an active condition with said body portions bent relative to each other; and a plurality of leaf springs, each leaf spring being disposed in a respective chamber of a respective hollow body portion for biasing said respective hollow body portion from said active condition towards said inactive condition in response to a decrease in pressure in said chambers of said respective hollow body portion.

6. A tool as set forth in claim 5 which further comprises an upper mattress secured to and over said hollow body portions for receiving a bed-ridden patient thereon.

7. A tool as set forth in claim 5 wherein said first housing member has a nipple communicating with said first distribution chamber for coupling to a pressure medium hose and said second housing member has a nipple communicating with said second distribution chamber for coupling to a pressure medium hose.

8. A tool comprising a bendable plate;

a plurality of pins rigidly secured to said plate in upstanding manner;

a planar body connected to said pins at points in spaced relation to said plate, said body including a pair of layers secured together about the periphery thereof, said layers having a plurality of partition walls defining a plurality of parallel chambers between said layers for receiving a pressure medium; and a conduit communicating with said chambers to selectively deliver a pressure medium thereto for expanding said chambers in a direction perpendicular to said plate while shrinking said chambers in a direction parallel to said plate and transverse to said chambers to effect movement of said points of said pins towards each other with a corresponding bending of said plate transversely of said chambers.

9. A tool as set forth in claim 8 which further comprises a first mattress of foam material between said plate and said body.

10. A tool as set forth in claim 9 which further comprises a second mattress of foam material secured to said body on a side opposite said first mattress.

11. A mattress comprising a hollow body having a plurality of partitions defining at least four longitudinally extending chambers for receiving a pressurized medium, each said chamber having an upper surface defining a part of a continuous upper supporting surface of said body and a lower surface defining a part of a continuous lower back surface of said body;

each said partition being disposed between a respective pair of chambers and extending between said upper supporting surface and said lower back surface;

each said partition having at least one passage communicating said respective pair of chambers with each other to convey a pressurized medium therebetween; and a bendable plate secured to one side of said body in facing relation to said lower back surface whereby upon expansion of said chambers in response to a pressurized medium therein said plate is bent transversely of said longitudinally extending chambers to deform said lower back surface in a convex manner and to deform said upper supporting surface in a concave manner.

12. A mattress as set forth in claim 11 wherein each chamber is of square cross-section.

13. A mattress as set forth in claim 11 which further comprises a first conduit connected to one of said chambers on one side of a centrally disposed one of said partitions for supplying a pressurized medium thereto and a second conduit connected to one of said chambers on an opposite side of said centrally disposed partition for supplying a pressurized medium thereto.

14. A mattress as set forth in claim 11 which further comprises a plurality of pins secured to and between said plate and said hollow body.

15. A mattress as set forth in claim 11 which further comprises at least one pivot bearing pivotally mounting said plate thereon centrally of said hollow body for pivoting relative to a bed rest.

16. A mattress as set forth in claim 15 which further comprises a pair of inflatable actuating means, each actuating means being disposed on an opposite side of said pivot bearing from the other of said actuating means for disposition between a bed rest and said plate for tilting of said plate in response to inflation of one of said actuating means.

17. A bed rest comprising a hollow body having a first plurality of partitions defining at least four longitudinally extending chambers for receiving a pressurized medium, each said chamber having an upper surface defining a part of a continuous upper supporting surface of said body and a lower surface defining a part of a continuous lower back surface of said body;

each said partition being disposed between a respective pair of chambers and extending between said upper supporting surface and said lower back surface;

a housing member for receiving a pressurized medium, said housing member being disposed transversely of said chambers and having port openings communicating in common with said chambers to convey pressurized medium thereto; and a plurality of leaf springs, each spring being disposed in a respective one of said chambers adjacent said upper surface thereof to shape said respective chamber into a flattened shape whereby upon expansion of said chambers in response to a pressurized medium therein said springs are bent longitudinally of said chambers to deform said back surface in a convex manner and to deform said upper surface in a concave manner.

18. A bed rest as set forth in claim 17 which further comprises a second plurality of partitions extending from an opposite side of said housing member relative to said first plurality of partitions, said second plurality of partitions defining longitudinally extending chambers in communication with said housing member to receive a pressurized medium therefrom.

19. A bed rest as set forth in claim 18 which further comprises a leaf spring in each respective chamber defined by said second plurality of partitions.

20. A bed rest as set forth in claim 18 which further comprises a yoke secured to said housing member for lifting and lowering of said housing member and a nipple on said yoke for coupling to a hose to convey a pressurized medium to said housing member.

21. A bed rest as set forth in claim 17 which further comprises a second housing member for receiving a pressurized medium, a plurality of partitions extending from said second housing member to define chambers for receiving a pressurized medium therefrom and a leaf spring in each of said latter chambers.

22. A bed rest as set forth in claim 17 which further comprises at least one nipple on said housing member for coupling to a hose for conveying a pressurized medium to said chambers.

23. A bed rest as set forth in claim 17 which further comprises support rings on said housing member for connection to a hoisting line.

24. A mattress comprising a hollow body having a plurality of partitions defining at least four parallel chambers for receiving a pressurized medium, each said chamber having an upper surface defining a part of a continuous upper supporting surface of said body and a lower surface defining a part of a continuous lower back surface of said body with said continuous lower surface of said body being of greater longitudinal extent than said continuous upper surface of said body;

each said partition being disposed between a respective pair of chambers and extending between said upper supporting surface and said lower back surface;

each said partition having at least one passage communicating said respective pair of chambers with each other to convey a pressurized medium therebetween; and at least one port for conveying a pressurized medium into said chambers whereby upon expansion of said chambers in response to the pressurized medium therein said continuous lower surface deforms in a convex manner and said continuous upper surface deforms in a concave manner.

25. A mattress as set forth in claim 24 which further comprises a housing member transverse to said chambers and having ports communicating with said chambers to convey a pressure medium therebetween.

26. A mattress as set forth in claim 24 wherein each chamber has a square cross-section.

* * * * *

CERTIFICATE OF CORRECTION

PATENT NO.    : 5,833,291

ISSUED        : Nov. 10, 1998

INVENTOR(S)   : Audun Haugs

It is certified that this error appears in the above-identified patent and that said Letters Patent is hereby corrected as shown below:

Title page, item [57],
In the Abstract, line 3, change "tuning" to -turning-

Col. 3, lines 4 to 5, cancel "the present invention ... on Jul.12, 1992."

Signed and Sealed this

Sixth Day of April, 1999

Attest:

Attesting Officer

Q. TODD DICKINSON

Acting Commissioner of Patents and Trademarks